United States Patent [19]
White, Jr.

[11] Patent Number: 5,367,143
[45] Date of Patent: Nov. 22, 1994

[54] APPARATUS AND METHOD FOR MULTI-BEAM DRILLING

[75] Inventor: Russell T. White, Jr., Conklin, N.Y.

[73] Assignee: International Business Machines Corporation, Armonk, N.Y.

[21] Appl. No.: 996,929

[22] Filed: Dec. 30, 1992

[51] Int. Cl.$^5$ .............................................. B23K 26/00
[52] U.S. Cl. .......................... 219/121.68; 219/121.73; 219/121.77
[58] Field of Search ...................... 219/121.68, 121.69, 219/121.73, 121.77

[56] References Cited

U.S. PATENT DOCUMENTS

| | | | |
|---|---|---|---|
| 3,617,683 | 11/1971 | Beresford | 219/121.71 |
| 3,742,182 | 6/1973 | Saunders | 219/121.7 |
| 3,770,529 | 11/1973 | Anderson | 219/121.71 X |
| 4,262,186 | 4/1981 | Provancher | 219/121.68 |
| 4,341,942 | 7/1982 | Chaudhari et al. | 219/121.64 |
| 4,430,548 | 2/1984 | Macken | 219/121.67 |
| 4,458,134 | 7/1984 | Ogle | 219/121.7 |
| 4,752,668 | 6/1988 | Rosenfield et al. | 219/121.68 |
| 4,789,770 | 12/1988 | Kasner et al. | 219/121.7 |
| 4,820,899 | 4/1989 | Hikima et al. | 219/121.76 |
| 4,839,497 | 6/1989 | Sankar et al. | 219/121.71 |
| 4,879,451 | 11/1989 | Gart | 219/121.69 |
| 4,915,981 | 4/1990 | Traskos et al. | 219/121.71 X |
| 4,940,881 | 7/1990 | Sheets | 219/121.69 |
| 5,223,693 | 6/1993 | Zumoto et al. | 219/121.68 |
| 5,310,986 | 5/1994 | Zumoto et al. | 219/121.7 |

*Primary Examiner*—C. L. Albritton
*Attorney, Agent, or Firm*—Pollock, Vande Sande & Priddy

[57] ABSTRACT

A multi-beam drilling apparatus for selectively removing material from a substrate, at least one radiation source producing at least one beam of coherent radiation switchable between an energized and a deenergized state, a mask fixedly position relative to a substrate and provided with a preselected pattern of passages for machining beam passage whereby each passage is larger than the applied beam passing therethrough, the coherent source and substrate with the mask are relatively positionable.

10 Claims, 1 Drawing Sheet

APPARATUS AND METHOD FOR MULTI-BEAM DRILLING

FIELD OF THE INVENTION

The present invention relates to laser drilling of holes in a substrate and particularly to a block or mask to selectively block or admit the laser beam.

BACKGROUND OF THE INVENTION

Laser technology is now widely used to more accurately and efficiently perform functions previously performed using other means. One particular field in which the laser has been especially useful is for cutting, drilling, and/or shaping materials. Specifically, lasers are used in the manufacturing and preparation of circuit boards, semiconductor wafers, and other articles used in the computer industry. Often, lasers are used because they perform functions faster, more accurately, with higher quality and to conform to stricter tolerances than mechanical processes are capable of achieving.

Such holes or passages are often formed in parts used in the computer industry to, among other purposes, selectively remove portions of conductive layers, to form passages for the attachment of other components, and/or to connect various layers of a substrate. Although a variety of types of lasers may be used for this application, it has been found that an excimer laser often produces favorable results when employed for the above described purposes. Excimer laser drilling, especially as related to high density circuit packaging technology, has some very significant positive attributes, such as the ability to form extremely small holes, applicability to numerous material sets, and the production of clean bottomed holes.

On the other hand, excimer lasers in particular have a number of drawbacks. Specifically, excimer lasers have a reputation for low through put simply because many pulses generally are required to form a hole. Additionally, excimer lasers include a relatively low pulse repetition rate.

To accomplish the formation of multiple holes in a substrate, requires the movement of the laser beam about the substrate either by moving the substrate or controlling the beam in some manner. A system in which the drilling is done while the part is actually moving is known as an "on-the-fly" system. With an on-the-fly system, a laser beam may be pulsed on and off as the laser source and substrate move relative to each other. The beam moves over the entire surface and then repeats this movement until the holes are all completely drilled. Using one beam, it is relatively simple to drill holes only in certain spots and not others, but the processing of a large substrate can take a long time.

To increase the speed with which a substrate may be processed, a plurality of beams may be caused to act on the substrate. For instance, one large beam may be divided into a plurality of smaller beams, such as a row of five beams. This row of beams may move across a substrate such that the first beam in the row may be caused to hit the first of a row of hole sites on a substrate. The row of beams is then caused to move so that the first beam strikes the second hole site and the second beam hits the first hole site. The row of beams moves down the substrate so that the beams sequentially hit each hole site on the substrate.

Such multi-beam on-the-fly drilling greatly increases the processing speed. However, unless every substrate processed has the same pattern of holes and the holes are all lined up and there are not places in which holes are not desired, some method must be used to selectively turn the beam on and off. The need for selectively turning the beam on and off increases as the number of beams the original laser beam is split into increases. Since only some of the split beams need to be blocked, the beam cannot be controlled electronically since all of the beams are derived from a single source. Therefore, mechanical means must be used to selectively block the laser beam. It has been contemplated to use a shutter or other similar means to mechanically block the laser beam from hitting the substrate. However, such systems are mechanically complex and can be expensive and difficult to operate at the high pulse rate typical in these laser processing applications.

In an attempt to solve the above described problems inherent with laser processing of substrates, a combination of hardware and software has been employed using nearly every pulse produced by the laser. However, the formation of holes in many materials requires numerous pulses from the laser, frequently forty or more. The requirement of numerous pulses plus the limitation of the finite pulse rate inherent of the lasers results in a relatively long process time even when using the on-the-fly system.

As described above, in an attempt to reduce the process time and increase the through put of the on-the-fly drilling system, the use of multi-beam drilling has been proposed. Such multi-beam drilling is made possible with a relatively high power excimer laser due to the inherent large beam size produced by the laser. However, a large fraction of the available laser energy may be discarded through the use of a beam shaping aperture located in the beam path.

Additional problems arising using a multi-beam system include the introduction of the complication that one or more of the multiple beams must be turned off, redirected, or otherwise blocked to achieve the needed goal of forming holes in certain locations but not in others. In an attempt to solve this problem, a combination hardware and software controlled blocking has been proposed including a plurality of actuators selectively blocking off one or more of the beams, thereby allowing holes to be selectively drilled at various locations on the substrate but not others. However, not only is this combination system mechanically complex but it also involves significant hardware and software resources to operate. The blockers used must be low mass in order to move quickly and also must have a sufficient thermal stability to survive repeated exposure to the laser pulses.

SUMMARY OF THE INVENTION

Among the objects of the present invention is to provide a system for multiple-beam on-the-fly drilling.

Another object of the present invention is to simultaneously and selectively form a plurality of holes with a plurality of beams selectively impinging on a substrate.

A further object of the present invention is to provide a mask which selectively admits a laser beam to a substrate but does not define the shape of the beam and selectively blocks the laser beam from impinging upon the substrate.

A still further object of the present invention is to solve problems existing in the prior art by providing a relatively inexpensive, uncomplicated, and adaptable system, both in terms of hardware and software, to accomplish the task of removing material from a substrate using a laser to form holes or other passages or for other purposes.

To accomplish these and other objects, the present invention provides an apparatus for selectively removing material from a substrate including a radiation source producing at least one beam of coherent radiation. The radiation is directed toward the substrate and should be of sufficient energy to vaporize the material forming the substrate. A mask is placed between the source of radiation and the substrate to selectively prevent the radiation from impinging upon the substrate. The mask should be formed of a material capable of preventing the passage of the type of radiation used and is fixed relative to the substrate. Means is also included to alter the relative positions of the radiation source and the combination of the substrate and the mask.

The present invention is also directed toward a method of selectively removing material from a substrate, including positioning at least one radiation source so that it can irradiate a substrate. The at least one radiation source produces at least one beam of coherent light. A beam shaping means is fixed in a position in the path of the at least one beam of coherent light between the at least one radiation source and the substrate. The beam shaping means includes a plurality of beam shaping apertures formed therein. The beam shaping apertures forming the at least one beam into a plurality of beams of a desired size and shape. A mask member is then placed in the path of the plurality of beams between the beam shaping means and the substrate. The mask member includes a relatively flat thin rectangular member and a plurality of passages formed therethrough in a predetermined pattern. The passages are larger than the plurality of beams of light. In this way, the mask does not shape the beams, it simply allows them to pass through to the substrate or blocks them. The mask member is then in a fixed position relative to the substrate.

After placing the components in the proper relative position, the radiation source is energized so that the plurality of beams strike the mask and selectively pass through the passages in the mask thereby irradiating the substrate and removing material therefrom. The radiation source is then selectively caused not to irradiate the substrate. The relative positions of the at least one radiation source and the mask and substrate are altered, allowing the plurality of beams to be directed at a different portion of the substrate. The radiation source is then again caused to irradiate the substrate and remove more material. The radiation source is caused to irradiate different parts of the substrate until a desired amount of material has been removed from the substrate.

VARIOUS AND PREFERRED EMBODIMENTS OF THE PRESENT INVENTION

Figure 1:
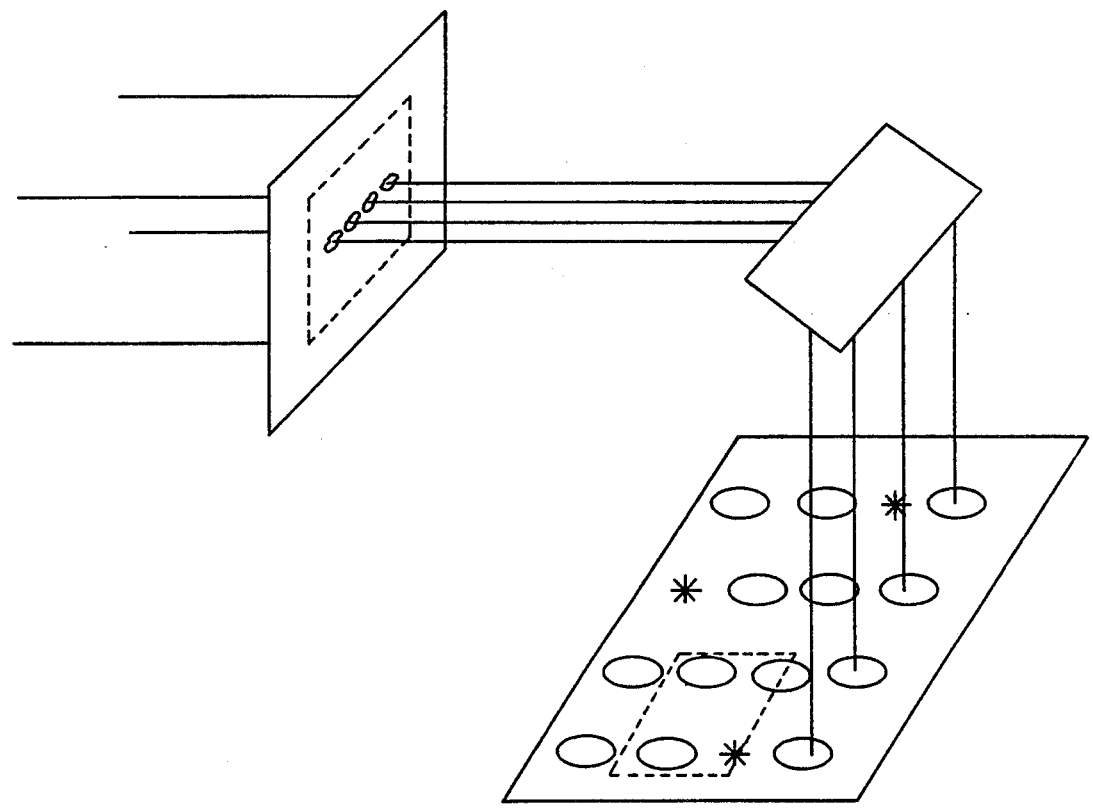
FIG. 1 is a perspective view showing various components of one embodiment of the present invention laser drilling apparatus.

As seen in FIG. 1, the present invention multi-beam drilling apparatus may include at least one radiation source(not shown). Preferably, the radiation is in the ultraviolet range. However, any wavelength may be used which results in the vaporization of the substrate. The embodiment shown in FIG. 1 includes one radiation source which produces a single large coherent beam 1 of radiation. This beam 1 may then split into a plurality of beams 4. However, the present invention may include means to produce a plurality of beams from a single source or a plurality of radiation sources, thereby eliminating the need to layer split a single beam into a plurality of beams.

In the embodiment shown in FIG. 1, the single beam 1 produced by the radiation source passes through beam shaping means 2 which includes a plurality of beam shaping apertures 3. The number of apertures included in the beam altering means 2 may be varied, depending upon the specific requirements of the production process being used. For instance, a square or rectangular array of beams such as a 4×4 matrix of holes could be used to provide 16 individual beams to act upon a substrate. Any increase in the number of beams impinging upon a substrate increases the through put of the system, thereby increasing the amount of energy delivered to the substrate.

Preferably, the beam 1, after passing through the beam shaping means 2 to be split into a plurality of beams 4, does not directly impinge upon the substrate or part. As in the embodiment shown in FIG. 1, the beams 4 preferably are reflected off of reflecting means 5 and directed toward the mask 100 and the underlying substrate. The reflecting means may be a mirror or any other material reflective to the wavelength of radiation produced by the radiation source. Various focusing elements may also bee included in the beam path to give the desired energy densities and beam sizes.

As seen in FIG. 1, the mask employed in the present invention multi-beam drilling apparatus preferably is made of a material which is opaque to the type of radiation produced by the radiation source. The mask may be placed between the radiation source and the substrate and preferably is located substantially near to or contacts the surface of the substrate. One example of a material which may be used to form the mask is molybdenum.

Figure 2:
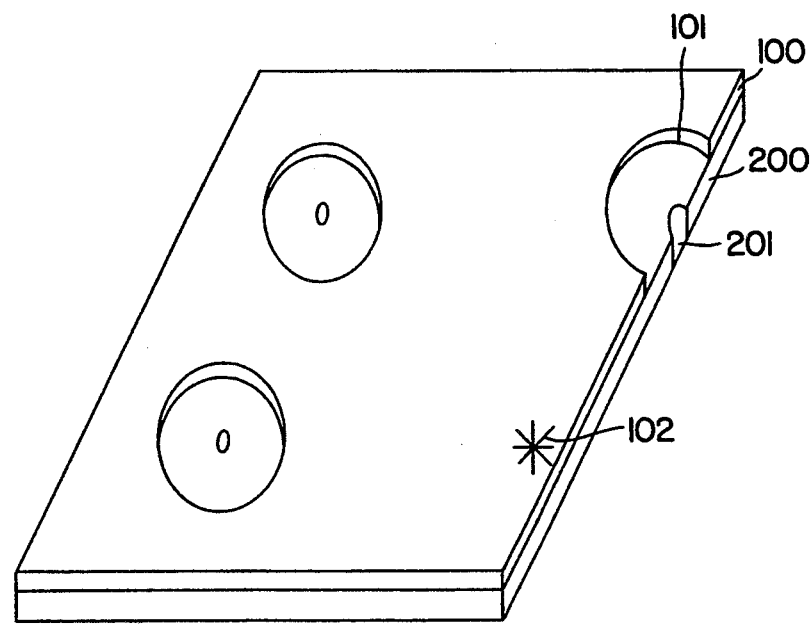
FIG. 2 is a close-up perspective view of the portion of the substrate surrounded by dotted lines in FIG. 1.

As stated above, the mask 100 of the present invention may be positioned in contact with the substrate as seen in FIG. 2 alternatively, the mask may be positioned so as to be physically separated from the substrate. One possible technique for minimizing damage to the blocker mask and extending its useful life would be to position it in physical separation from the substrate or part to be drilled. In this position, the beam or beams which are normally focused on the surface of the substrate facing the reflective surface, would be less focused away from the surface of the substrate or part, therefore providing less density energy to the surface of the mask. In addition, by separating the mask from the substrate or part, air would be permitted to flow and surround the mask thereby cooling the mask and providing a more effective heat sink. This in turn would tend to increase overall dimensional stability.

To selectively admit radiation, the mask 100 preferably includes a plurality of holes 101 formed therein to allow the radiation to pass and contact the substrate or part 200. The holes 101 in the mask 100 should be located in positions such that when the mask 100 is located in the proper position, between the radiation source and the substrate, the mask will permit the radiation to strike the substrate. The areas of the substrate in which holes are not required are covered by the solid portions of the substrate as seen in FIG. 1.

The portions of the mask directly blocking the beam are designated 102. These radiation blocking areas 102 are shown in detail in FIG. 2. The beams of radiation formed by the beam shaping means 2 and reflected by the reflecting means 5 and admitted into contact with the holes 101 formed in the mask 100 vaporize the material comprising the substrate to form holes or passages 201 in the substrate as seen in FIG. 2. The alignment accuracy of the mask is not very critical since the holes 101 formed in the mask 100 are relatively large. The mask must be sufficiently thick and/or reflective to maintain its integrity after being exposed to repeated laser pulses which form the holes 201 in the substrate 200. If made of sufficiently stable material, the mask may be used multiple times in forming holes in various substrates.

The holes 101 formed in the mask 100 as seen in FIG. 2 are formed about the area where a hole is desired and formed in the substrate. The holes 101 in the mask 100 need not be formed exactly in the diameter of the hole desired to be formed in the substrate and, as seen in FIG. 2 actually may be formed some distance away from where it is desired for the radiation to pass. The holes in the mask are not meant to play a role in shaping the beam, rather, the actual formation of the beam of radiation is performed by the beam shaping means 2 and any focusing lenses 6 included in the apparatus. More importantly, the mask should block undesired radiation where a hole in not desired in the substrate or part rather than to admit radiation to the substrate in an exact point on the part 200.

Given the facile configuration and relatively small number of components comprising the present invention, the present invention provides a very expedient and low cost solution to the forming of holes in a substrate. By including multiple beam paths the present invention allows for a faster formation of holes in the substrate as well as increasing the amount of energy reaching the substrate as a result of the beam paths included in the present invention.

The present invention also comprises a method for employing the above described multi-beam drilling apparatus to form holes in a part or substrate. According to the method for utilizing the apparatus included in the present invention, the substrate is placed on a substrate support (not shown). The mask is then placed in the proper position between the radiation source and the part or substrate so as to result in the beam impinging upon the part or substrate to form holes where desired. The radiation source is focused so as to provide the required energy density on the surface of the part or substrate. The substrate and mask are then positioned to start the hole forming process. In the embodiment shown in FIG. 1, the substrate and mask would preferably be positioned so that a row of holes such as 103 formed at one end of the substrate would be opposite where the radiation would be reflected onto the part or substrate.

After the positioning of the substrate and mask, the radiation source may be activated. The radiation source preferably remains activated until the holes are formed in a desired location in the desired size and depth in the substrate. The radiation source may then be deactivated and the substrate and mask moved in the same manner to alter their positions by the same amount relative to the reflected radiation. This allows the radiation to act upon the next series of holes 104 as shown in the embodiment shown in FIG. 1. This step in the process may include changing the position of the radiation source and/or the reflecting means 5 so as to alter the position that the radiation irradiates the substrate or part. After moving the substrate and mask or the radiation source, the radiation source is then activated again. The substrate and mask and/or radiation source may be moved relative to each other and the radiation source activated and deactivated until holes are formed in all desired positions in the substrate.

Depending upon the application involved, the blocker mask is typically about the same size as the substrate or at least as large as the region of the substrate to be drilled. However, if the substrate includes a number of regions including identical patterns of holes, the mask may be only slightly larger than one section of the pattern of holes and may be moved about the substrate. The cost of the mask may be reduced by reducing its size, however, by making the mask larger than the substrate, the tasks oil fixturing and holding the mask may be simplified.

The thickness of the mask also varies with the application involved. Typically, the mask may be about 0.001"-0.010" thick. More typically, the mask may be about 0.005" thick. One variable which affects the mask thickness is whether the mask is suspended over the substrate or is supported by surface of the substrate. If the mask is suspended, it is typically about 0.005" thick. A mask of this thickness may be supported over a 20"×20" substrate and be supported only about the edge of the substrate. Naturally, the larger the substrate drilled, the thicker a suspended mask would need to be.

The distance a mask may be located from the substrate depends upon the size of the beam relative to the holes in the mask and if any lenses are included in the apparatus and the focal length of the lenses. For example, if a short focal length lens, such as about 2" is used and the holes in the blocker mask are only slightly larger than the beam, such as with holes about 0.006" and a beam about 0.004", the mask may be suspended only a short distance, such as about 0.005", off of the substrate. However, if a relatively longer focal length lens is used, such as about 5", and the holes are much larger than the beam, such as with holes about 0.016" and a beam about 0.004", the mask could be suspended a larger distance off of the substrate, such as up to about 0.25". The mask may be suspended at any distance off of the substrate as long as it does not interfere with the beam.

As stated above, the size of the holes is very important to the overall setup of the apparatus. Typically, the holes are about 0,001"-0.005" larger than the diameter of the laser beam(s) directed at the substrate. More typically, the holes are about 0.003" larger than the diameter of the beam. The size of the holes is at least partially dependent upon the spacing of the holes in the substrate. If it is desired to form the holes in the substrate very close together, then the holes in the blocker mask must be smaller. Smaller holes in the mask can make alignment of the entire apparatus more difficult.

Any type of laser may be used with the present invention. In one example, an excimer laser and a molybdenum mask were used. Lasers have been used with wavelengths of 193 nm, 248 nm, 308 nm, and 351 nm. The power limits on the laser are approximated by calculating the energy per area of the part and may be up to about 10J/cm$^2$. Typical beam diameters, after the beam has passed through the beam shaping means is about 0.0025"–0.005". In the above described examples, it has been found that the blocker mask is extremely durable.

Examples of materials which may be drilled using this system include polyimides, such as Kapton and Upilex, and filled fluoropolymers, such as polytetrafluoroethylene (PTFE) filled with silicon particles, such as Rogers 2810. Although pares drilled using the present invention may be any size and thickness, they are typically about 0.005" thick and are typically about 10"×15". These are merely examples of uses of the present invention. Of course, the present invention is not limited to just these examples.

When drilling a typical substrate, the laser is electronically pulsed on and off. The laser may be pulsed in single bursts, or may be pulsed at a frequency of from about 100–400 hz. Typically, the laser is pulsed at about 200 pulses per second. Typically, the pulses are about 25 nanoseconds long. The laser will not be pulsed unless the part being drilled is not correctly positioned. Such a pulse rate and duration typically results in drill through a typical substrate at about 2–4 $\mu$m per pulse. The typical high density circuit board of about 0.005" requires about 50 pulses to form a hole completely through it.

In the typical setup for drilling a part, the reflecting means is located about 23 cm above the part to be drilled. If any lenses are included in the apparatus, they will typically be positioned about 15 cm above the part and about 8cm from the reflecting means. With such a setup, the beam shaping means is typically located about 107 cm away from the reflecting means, with the laser output being about 130 cm away from the beam shaping means.

When drilling a part, with the above typical setup, the table supporting the substrate and mask typically moves at about 1"/sec., with a typical pulse rate of about 200 hz. These operational parameters result in about 2–4 $\mu$m being removed from the substrate per pulse. Of course, the above values depend upon the entire setup of the apparatus and particularly upon the number of beams the laser beam is split up into.

I claim:

1. A multi-beam drilling apparatus for selectively removing material from a substrate, comprising:
   at least one radiation source producing at least one beam of coherent radiation, said at least one beam being formed into a plurality of coherent beams, said radiation being directed toward said substrate and being capable of vaporizing said substrate;
   means to selectively switch said radiation source between an energized state and a deenergized state;
   mask means located on or near the substrate and placed between said radiation source and the substrate, said mask means being formed of a material which blocks said radiation from reaching the substrate, said mask including a preselected pattern of passages formed therethrough selectively allowing said radiation to impinge upon the substrate, said passages being larger than said beam, said mask being in a fixed position relative to the substrate; and
   means to alter the relative positions of the radiation source and the substrate and said mask.

2. The multi-beam drilling apparatus according to claim 1, wherein said radiation source produces a single coherent beam of radiation, and said wherein said multi-beam drilling apparatus includes beam shaping means to form a plurality of beams from said single coherent beam.

3. The multi-beam drilling apparatus according to claim 2, wherein said beam shaping means includes a plurality of beam shaping apertures wherein each of said apertures are of a size to produce a beam of radiation focused on the substrate.

4. The multi-beam drilling apparatus according to claim 1, including a plurality of radiation sources each producing a beam of coherent ultraviolet radiation.

5. The multi-beam drilling apparatus according to claim 1, wherein said radiation source is directed toward said substrate by reflecting means interposed between said radiation source and said substrate.

6. The multi-beam drilling apparatus according to claim 1, wherein said mask is in contact with said substrate.

7. The multi-beam drilling apparatus according to claim 1, wherein said mask is separated from said substrate, thereby allowing air to circulate completely around and cool said substrate.

8. The multi-beam drilling apparatus according to claim 1, wherein a lens is placed between said radiation source and said substrate.

9. A mask member opaque to a predetermined wavelength of radiation, said mask member being placed between a radiation source producing a plurality of beams of coherent radiation and a substrate, said mask comprising:
   a relatively flat thin rectangular member;
   a plurality of passages formed through said mask member in a predetermined pattern, said passages being larger than said beams of light and allowing said beams to selectively irradiate said substrate.

10. A method of selectively removing material from a substrate, comprising the steps of:
   a) positioning at least one radiation source so that it can irradiate a substrate, said at least one radiation source producing at least one beam of coherent light;
   b) fixing a beam shaping means in a position in the path of said at least one beam of coherent light between said at least one radiation source and said substrate, said beam shaping means including a plurality of beam shaping apertures formed therein, said beam shaping apertures forming said at least one beam into a plurality of beams of a desired width;
   c) placing a mask member in the path of said plurality of beams between said beam shaping means and said substrate, said mask member including a relatively flat thin rectangular member and a plurality of passages formed therethrough in a predetermined pattern, said passages being larger than said beams of light, said mask member being in a fixed position relative to said substrate;
   d) energizing said radiation source so that said plurality of beams strike said mask and selectively pass through said passages in said mask thereby irradiating said substrate and removing material therefrom;
   e) causing said radiation not to irradiate said substrate;
   f) altering the relative positions of said at least one radiation source and said mask and substrate allowing said plurality of beams to be directed at a different portion of said substrate;
   g) repeating steps d) through f) until a desired amount of material has been removed from said substrate.

* * * * *